(No Model.) 2 Sheets—Sheet 2.
T. H. BURRIDGE.
MACHINE FOR CLEANING WIRE.
No. 294,847. Patented Mar. 11, 1884.
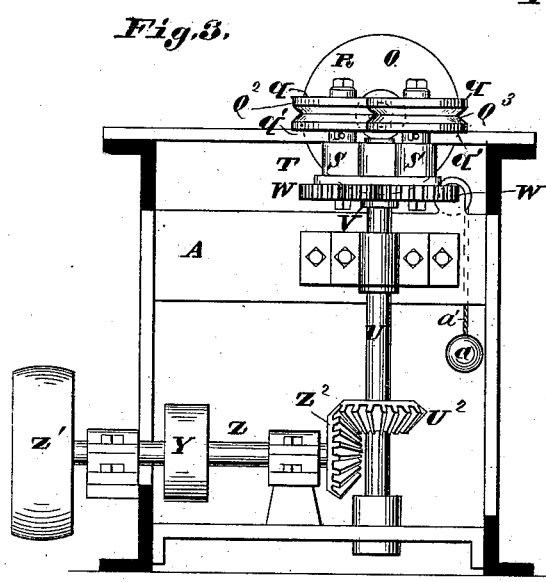
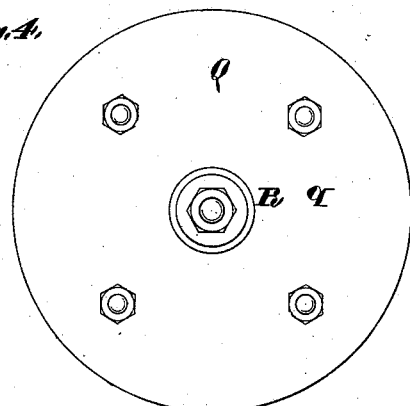
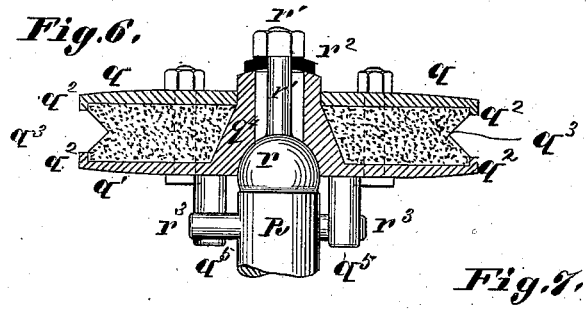
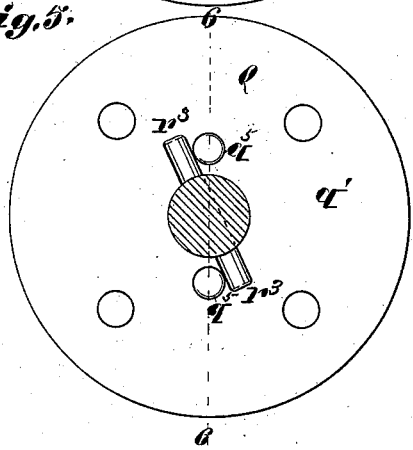
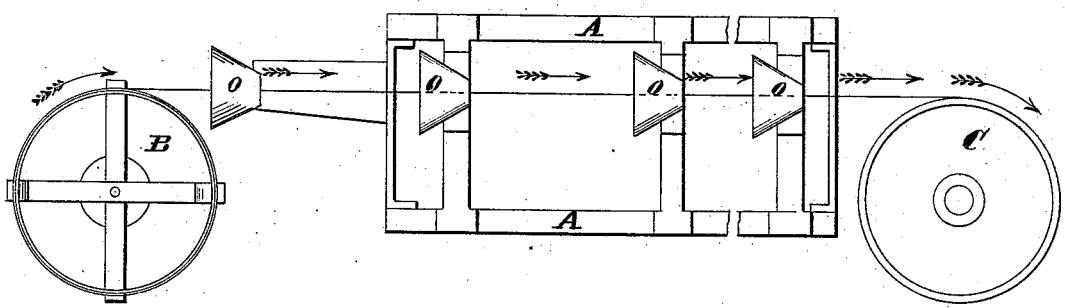
Attest: Charles Pickles, Wm. G. Sayers.
Inventor: Thomas H. Burridge
By Knight Bros.
Attys.

UNITED STATES PATENT OFFICE.

THOMAS H. BURRIDGE, OF ST. LOUIS, MISSOURI, ASSIGNOR OF TWO-THIRDS TO WILLIAM L. REYNOLDS AND JOHN W. GOVIER, OF SAME PLACE.

MACHINE FOR CLEANING WIRE.

SPECIFICATION forming part of Letters Patent No. 294,847, dated March 11, 1884.

Application filed June 16, 1883. (No model.)

*To all whom it may concern:*

Be it known that I, THOMAS H. BURRIDGE, of the city of St. Louis, in the State of Missouri, have invented a certain new and useful Improvement in Machines for Cleaning Wire, of which the following is a full, clear, and exact description, reference being had to the accompanying drawings, forming part of this specification.

This is a machine for removing rust, &c., from wire. The claims are referred to for the statement of invention.

Figure 1 is a top view of the machine, the reel and draw-head not being shown. Fig. 2 is a side elevation. Fig. 3 is a transverse vertical section at 3 3, Fig. 1, showing the parts beyond the section plane. Figs. 4 and 5 are enlarged side views of the opposite sides of one of the emery-wheels. Fig. 6 is a section at 6 6, Fig. 5. Fig. 7 is a diagram illustrating the invention.

A is the frame of the machine, which may be of any suitable construction.

B is a common wire-reel containing the wire to be operated upon.

C is an ordinary wire draw-head, by which the wire is drawn through the machine. The reel should be provided with some form of brake to cause the stretching of the wire in the machine.

The wire is shown in dotted lines at D in Figs. 1 and 2, and in a full line in the diagram, Fig. 7. On the wire leaving the reel, it first passes between straightening-rollers arranged as follows:

E and G are two horizontal grooved wheels turning on fixed arbors.

F' is a hinged arm, carrying at its free end a wheel, F, located between the wheels E and G, and bearing against the opposite side of the wire from these wheels. The wheel F is drawn toward the wire by a weight, H', upon a cord, H, which is attached to the arm F', and which passes over a grooved pulley, I.

K, L, and M are three grooved wheels similar to the wheels E F G, except that the wheels are vertical in place of horizontal. The wire passes over the wheels K M and under the wheel L, the latter being supported upon the free end of the hinged arm L', and pulled down upon the wire by a weight, N', connected to the arm L' by a cord or link, N. The effect of these wheels is to remove any kink or short bend from the wire.

O is a conical guide through which the wire passes to an idle-wheel, P, over which it runs to the emery-wheels Q and Q', passing beneath wheel Q and above wheel Q'. The wheels are upon shafts R, turning in bearings S of an oscillating head, T. The head T oscillates on a shaft, U, carrying a cog-wheel, V, that engages cog-wheels W, fast upon the shafts R. Thus it will be seen that the rotation of the shaft U causes the rotation of both of the wheels Q Q'. The shaft U is driven by a belt, X, upon a pulley U' of the shaft U, and a pulley, Y, upon the main shaft Z of the machine. The main shaft is driven by a belt on pulley Z'. The wheel Q is pulled down upon the wire by a weight, $a$, connected by a cord, $a'$, to that end of the head which bears the wheel Q. It will be seen that the depression of the wheel Q upon the wire at the same time lifts the wheel Q' and presses it against the under side of the wire. From the wheel Q' the wire passes through another guide, O, to a carrying or idler pulley, P, and from that to an emery-wheel, $Q^2$, and then to emery-wheel $Q^3$. These wheels, except as to their horizontal position, are similarly arranged to the wheels Q and Q', the wire passing between them, and its opposite sides being dressed by the two wheels. The draw-cord $a'$ in this case is attached to end of the head carrying the wheel $Q^2$, and passes over a pulley, $a^2$, between the weight $a$ and the head T. The vertical shaft U in this case carries a bevel-wheel, $U^2$, that engages with a similar wheel, $Z^2$, upon the main shaft Z. Beyond the wheel $Q^3$ the wire passes through a guide, O, to the draw-head C, by which it is drawn through the machine.

I will now describe the novel construction of the emery-wheels and the manner of connecting them to the shafts R, a description of one applying equally to all.

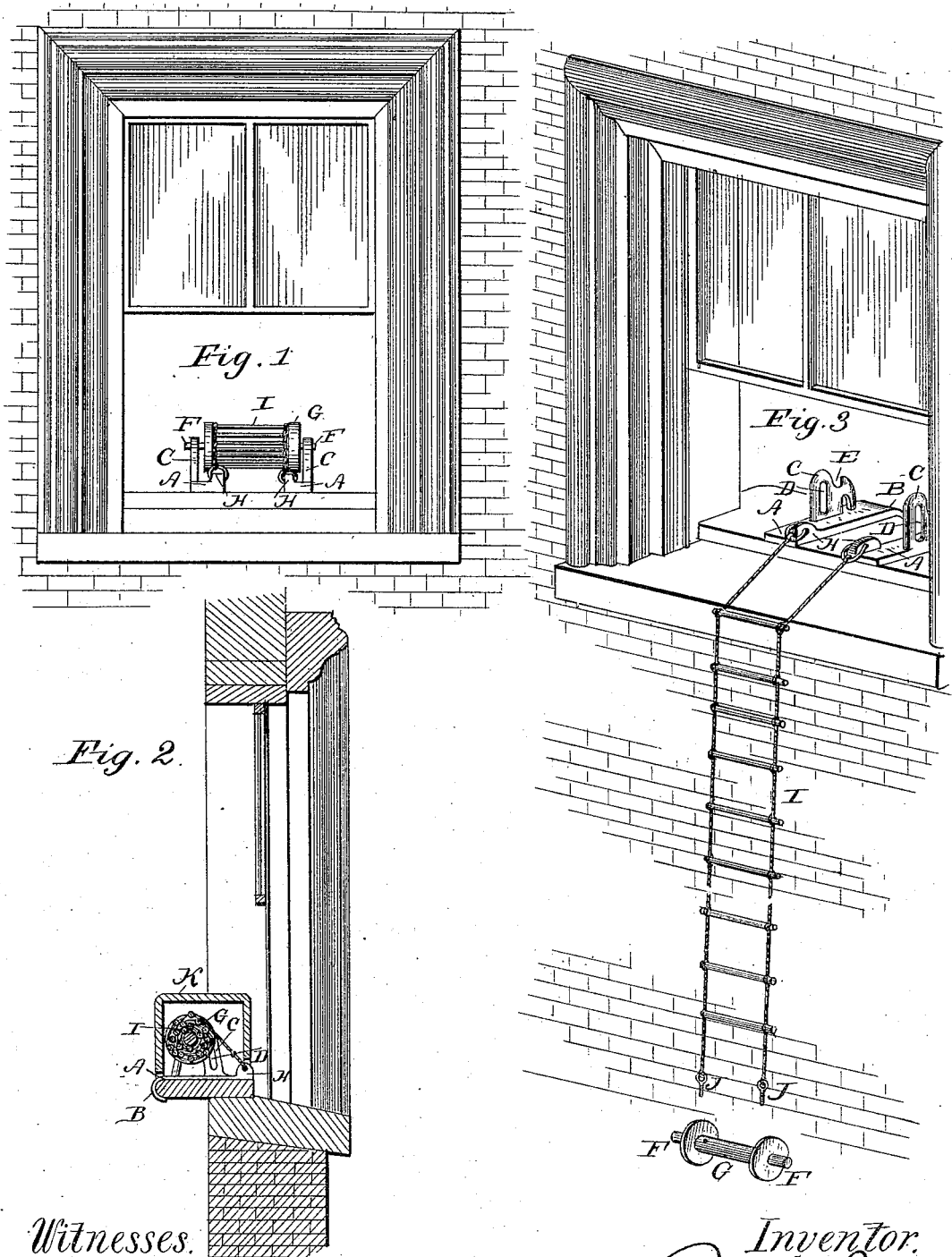

The wheel Q has side plates, $q$ and $q'$, both of which have inturned marginal flanges $q^2$, lapping a little distance over the circumfer-